US009527410B2

(12) United States Patent
Leconte

(10) Patent No.: US 9,527,410 B2
(45) Date of Patent: Dec. 27, 2016

(54) HINGE MECHANISM AND VEHICLE SEAT COMPRISING SUCH A MECHANISM

(71) Applicant: FAURECIA Sièges d'Automobiles, Nanterre (FR)

(72) Inventor: Sébastien Leconte, Flers (FR)

(73) Assignee: Faurecia Sieges d'Automobiles, Nanterre (FR)

( * ) Notice: Subject to any disclaimer, the term of this patent is extended or adjusted under 35 U.S.C. 154(b) by 8 days.

(21) Appl. No.: 14/635,615

(22) Filed: Mar. 2, 2015

(65) Prior Publication Data

US 2015/0246625 A1  Sep. 3, 2015

(51) Int. Cl.
*B60N 2/02* (2006.01)
*B60N 2/225* (2006.01)
*B60N 2/22* (2006.01)
*B60N 2/235* (2006.01)

(52) U.S. Cl.
CPC ........... *B60N 2/2252* (2013.01); *B60N 2/2227* (2013.01); *B60N 2/2356* (2013.01)

(58) Field of Classification Search
CPC ............................ B60N 2/2356; B60N 2/2352
USPC ........................................................ 297/367 R
See application file for complete search history.

(56) References Cited

U.S. PATENT DOCUMENTS

| 5,984,413 A * | 11/1999 | Baloche | B60N 2/2358 |
| | | | 297/367 R |
| 6,082,821 A * | 7/2000 | Baloche | B60N 2/2358 |
| | | | 297/354.12 |
| 7,802,849 B2 * | 9/2010 | Tarusawa | B60N 2/2356 |
| | | | 297/367 P |
| 8,585,149 B2 * | 11/2013 | Villarroel | B60N 2/20 |
| | | | 297/367 L |
| 2008/0169695 A1 * | 7/2008 | Hahn | B60N 2/12 |
| | | | 297/367 R |
| 2010/0171351 A1 * | 7/2010 | Thiel | B60N 2/2252 |
| | | | 297/341 |

FOREIGN PATENT DOCUMENTS

| DE | 10 2010 039 066 A1 | 2/2012 |
| EP | 2 106 723 A1 | 7/2009 |
| WO | WO 2009/146524 A1 | 12/2009 |
| WO | WO 2013/010918 A1 | 1/2013 |
| WO | WO 2014/086824 A1 | 6/2014 |

OTHER PUBLICATIONS

Search report for related French Application No. 14 51704; report dated Nov. 4, 2014.

* cited by examiner

*Primary Examiner* — Laurie K Cranmer
(74) *Attorney, Agent, or Firm* — Miller, Matthias & Hull LLP

(57) ABSTRACT

Hinge mechanism comprising a first frame and a second frame mounted to rotate relative to one another and bounding an interior space, an adjustment device adapted to allow adjustment of the angular position between the first frame and second frame, a stop member integral with the first frame and arranged within the interior space, the stop member cooperating in abutment with the second frame to limit the relative rotation of the first frame and second frame between first and second angular end-of-travel positions. The stop member protrudes from the first frame.

10 Claims, 10 Drawing Sheets

HINGE MECHANISM AND VEHICLE SEAT COMPRISING SUCH A MECHANISM

CROSS-REFERENCE TO RELATED APPLICATION

This application claims priority under the Paris Convention to French Patent Application No. 14 51704 filed on Mar. 3, 2014.

FIELD OF THE DISCLOSURE

The present invention relates to hinge mechanisms and to vehicle seats comprising such mechanisms.

BACKGROUND OF THE DISCLOSURE

More specifically, a hinge mechanism may comprise:
a first frame and a second frame mounted to rotate relative to one another about at least one axis of rotation and at least partially bounding an interior space,
an adjustment device adapted to allow adjustment of the angular position between the first frame and second frame,
a stop member integral with the first frame and arranged within the interior space, the stop member cooperating in abutment with the second frame to limit the relative rotation of the first frame and second frame between first and second angular end-of-travel positions.

Document WO-A-2013/010918 describes an example of a hinge mechanism of this type, in which the stop of the first frame is obtained by fine punching (referred to as "half shear") and the stop enters a window arranged in the second frame.

SUMMARY OF THE DISCLOSURE

The hinge mechanism described in that document has the disadvantage of requiring a special tool for this particular application, which raises the cost of the hinge mechanism.

The present invention is intended to overcome these disadvantages.

To this end, the invention provides a hinge mechanism comprising:
a first frame and a second frame mounted to rotate relative to one another about at least one axis of rotation and at least partially bounding an interior space, the second frame comprising an annular rim at least partially receiving the first frame and having an axial end face,
an adjustment device adapted to allow adjustment of the angular position between the first frame and second frame,
a stop member protruding from the first frame and at least partially arranged within the interior space, the stop member cooperating in abutment with the second frame to limit the relative rotation of the first frame and second frame between first and second angular end-of-travel positions,
wherein the axial end face of said annular rim comprises a stepped-down recess in only a portion of the axial thickness of the annular rim and extending angularly between two shoulders, said recess forming a guide track along a circular arc contained in a radial plane and extending angularly between two shoulders forming counter-stops,
and wherein the stop member extends in a radial plane in immediate proximity to the radial plane containing the guide track, said stop member projecting radially to said guide track, such that the stop member is mounted to move along said guide track and is adapted to cooperate with said counter-stops to limit the relative rotation of the first frame and second frame between the first and second angular end-of-travel positions.

This avoids the disadvantages described above.

In addition, the above arrangements do not increase the footprint of the hinge mechanism and have little or no impact on the internal architecture of the hinge mechanism, which makes this design possible in many types of existing hinge mechanisms.

It is equally possible to use the first and second frames in:
applications requiring the first and second stop positions, in which case the stop member is mounted on the first frame,
or in applications not requiring the first and second stop positions, in which the stop member is simply omitted.

In addition, it is possible to vary the first and/or second stop position from one model to another of the hinge mechanism, using stop members of different shapes, and doing so with the same first and second frames.

In various embodiments of the hinge mechanism according to the invention, one or more of the following arrangements may possibly be used:
the first frame comprises a first set of teeth, in particular directed radially outward, and the second frame comprises a second set of teeth formed in the annular rim, in particular directed radially inward, the first set of teeth meshing with the second set of teeth in a radial plane containing the guide track in order to adjust the relative angular position between the first frame and second frame;
the stop member is in the form of a pin projecting radially outward, formed as an integral part of a radial ring;
the radial ring is integral to the first frame;
the first frame comprises an axial neck and the flat radial ring engages with and/or is attached to the axial neck;
the stop member is a wedge secured within a housing provided in the first frame;
the stop member is a wedge secured within a housing provided in the first frame and the housing is formed at the periphery of the first frame in only a portion of the thickness of the first set of teeth.

The invention also relates to a vehicle seat comprising first and second parts connected to each other by a hinge mechanism as defined above, the first and second frames being attached one to the first part and the other to the second part. It is possible for one of the first and second seat parts to be a seating part and the other to be a backrest.

Of course, the different features, variants, and/or embodiments of the present invention can be associated with each other in various combinations as long as they are not incompatible or mutually exclusive.

BRIEF DESCRIPTION OF DRAWINGS

The invention will be better understood and other features and advantages will become apparent upon reading the following detailed description of some embodiments provided for illustrative purposes with reference to the accompanying figures, presented as non-limiting examples, which can serve to provide a better understanding of the invention and its implementation and, where appropriate, contribute to its definition, where.

DETAILED DESCRIPTION

In the various figures, the same references denote identical or similar structural and/or functional elements in the various embodiments. Unless otherwise indicated, such elements may therefore have identical structural, dimensional and material properties.

For clarity, only those elements necessary for understanding the described embodiments have been represented and described in detailed.

Figure 1:
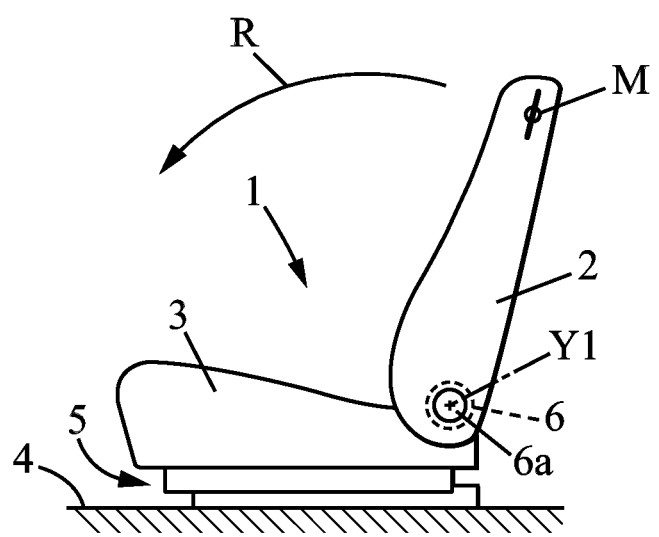
FIG. 1 is a schematic side view of a vehicle seat which can be equipped with a hinge mechanism according to the invention.

FIG. 1 is a schematic side view of a vehicle seat 1, preferably a front seat 1, that can be equipped with a hinge mechanism 6 according to the invention, and shows the seat 1 comprising a backrest 2 mounted to pivot about a pivot axis Y1, or first axis Y1, on a seating part 3, said seating part 3 in turn being mounted on the vehicle floor 4, for example on slide rails 5.

The angle of the backrest 2 is thus manually adjustable by means of a control knob 6a, in particular a rotating control knob 6a or similar arrangement which drives the hinge mechanism 6, in particular a gear mechanism providing positive control of the rotation of the backrest 2.

In the example considered here, the backrest 2 can also be angled forward in a counterclockwise direction R (or possibly backwards in the opposite clockwise direction), for example in order to fold it flat or to access the rear seating in the vehicle, by actuating a lever M, in particular located at the top of the backrest 3, which controls a seat angle position control that is part of the hinge mechanism 6.

Figure 2:
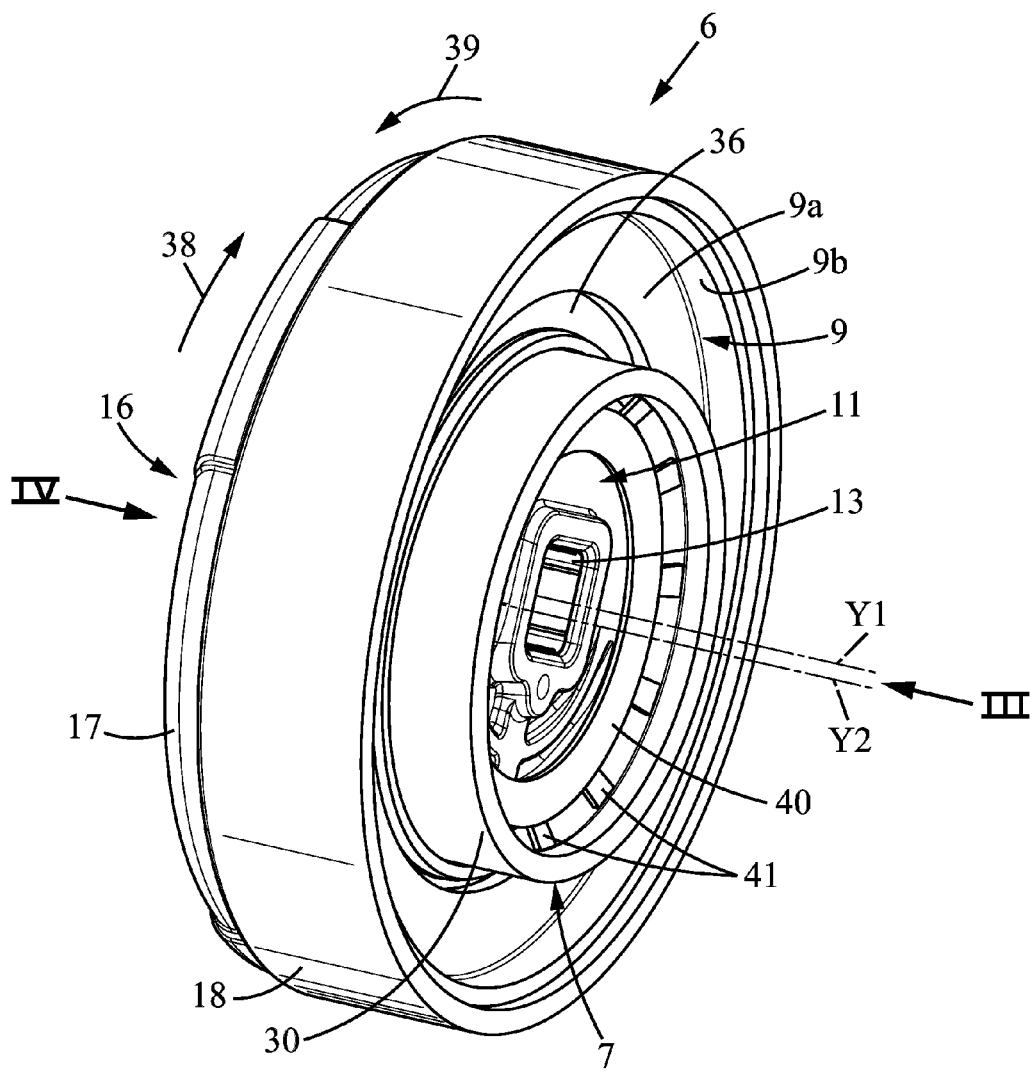
FIG. 2 is a perspective view of the hinge mechanism equipping the seat of FIG. 1, in a first embodiment of the invention.
Figure 3:
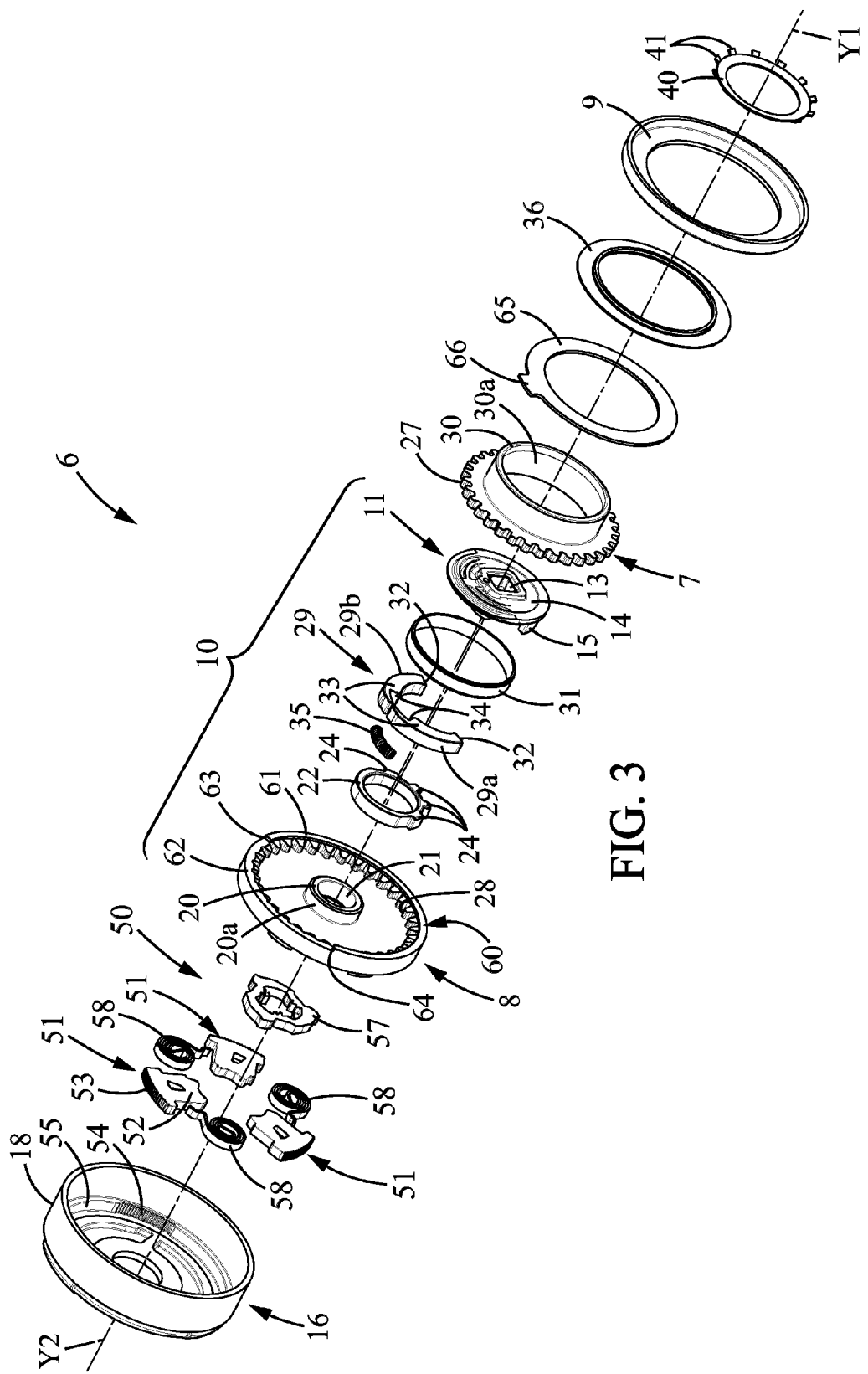
FIGS. 3 and 4 are exploded perspective views of the hinge mechanism of FIG. 2, respectively viewed in directions III and IV of FIG. 2.
Figure 4:
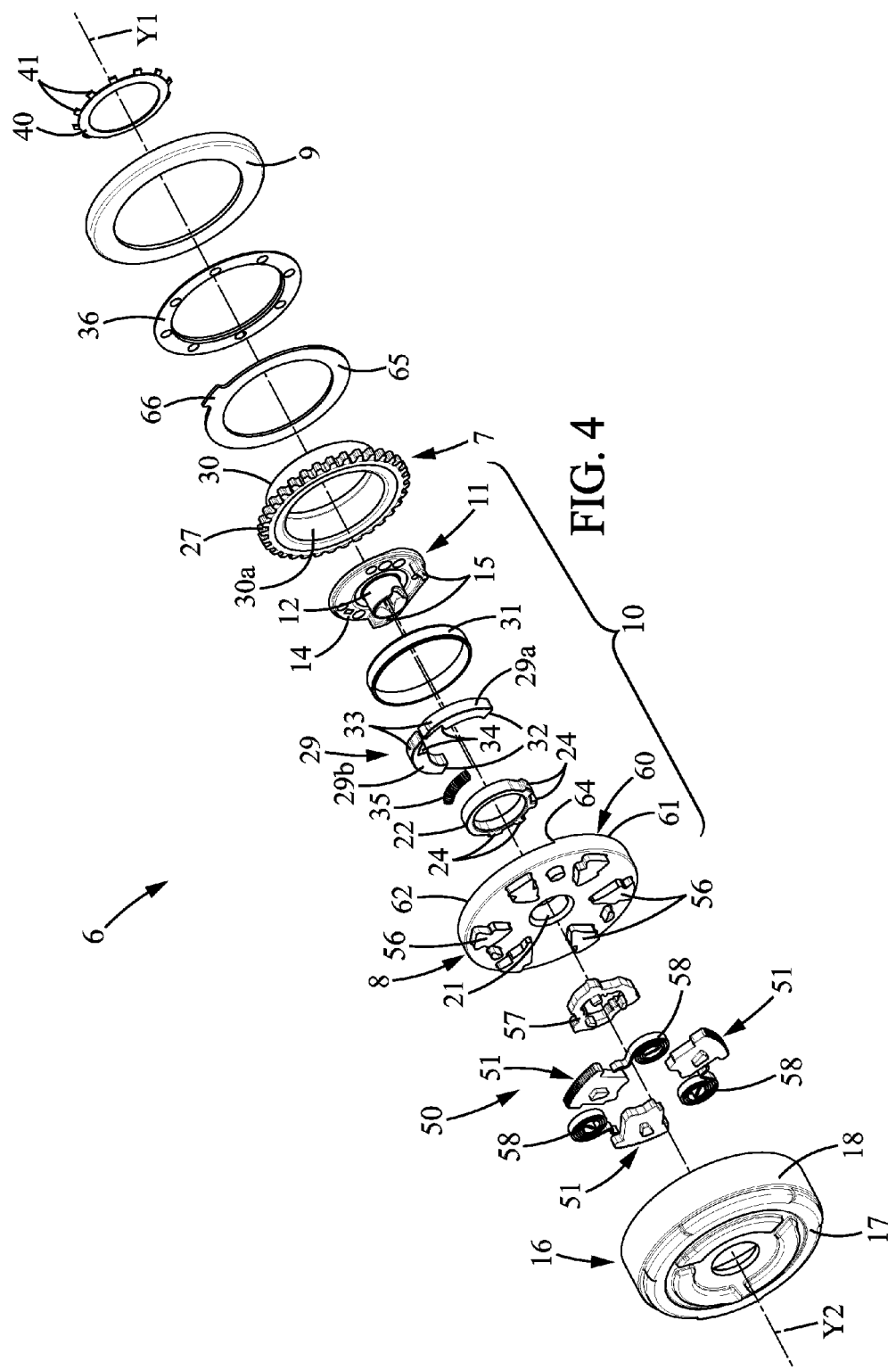
Figure 5:
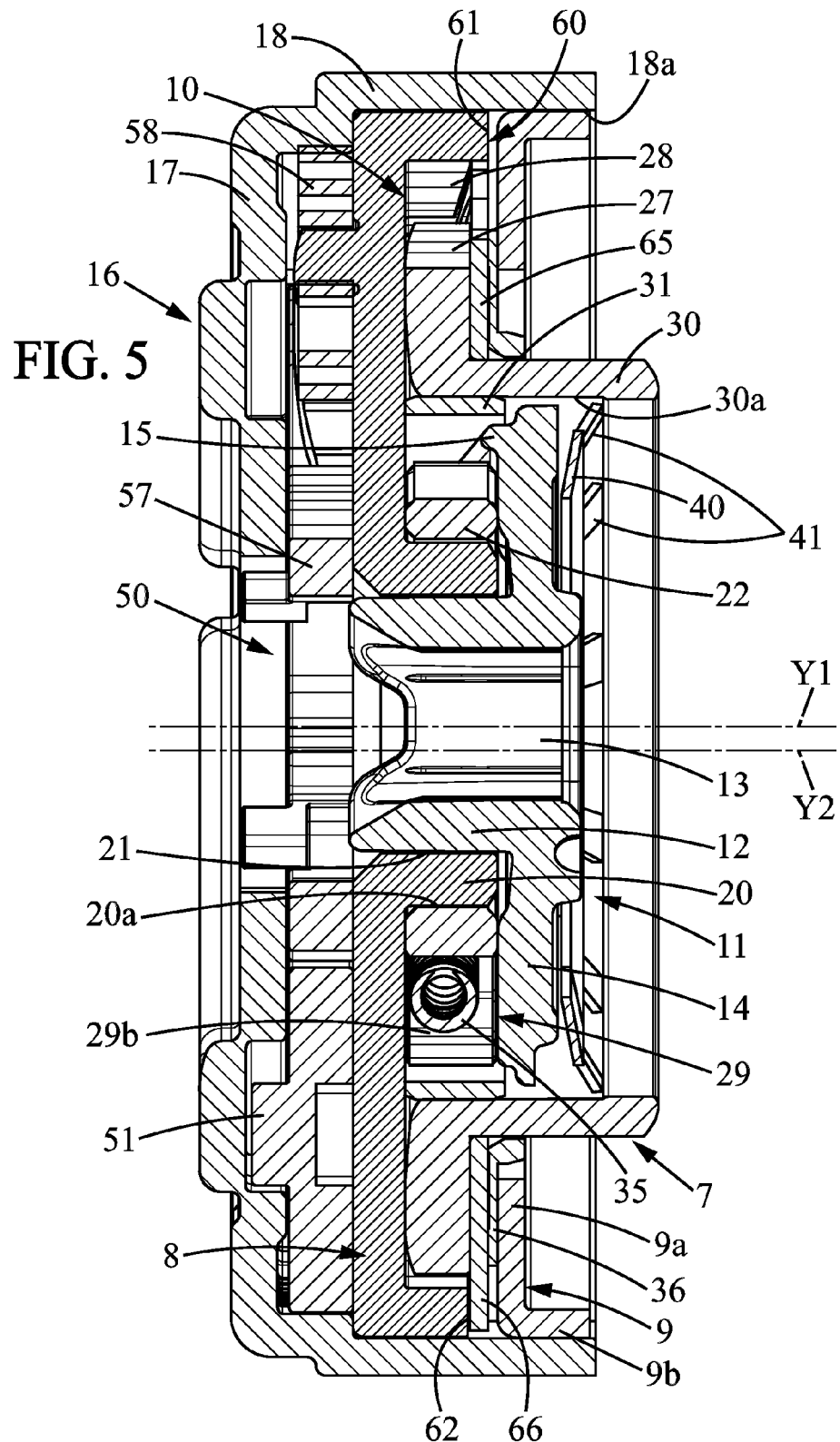
FIG. 5 is an axial sectional view of the hinge mechanism of FIG. 2, FIGS. 6 to 9 are views respectively similar to FIGS. 2 to 5, for a second embodiment of the invention.
Figure 6:
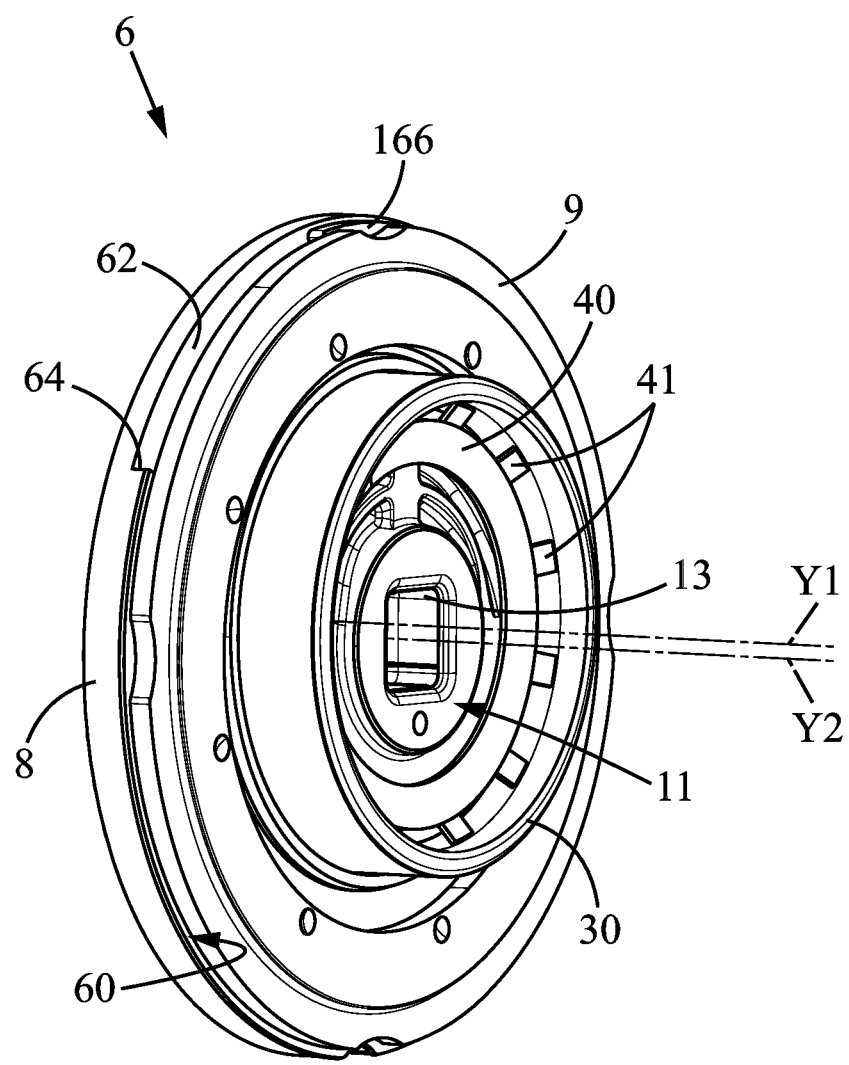
Figure 7:
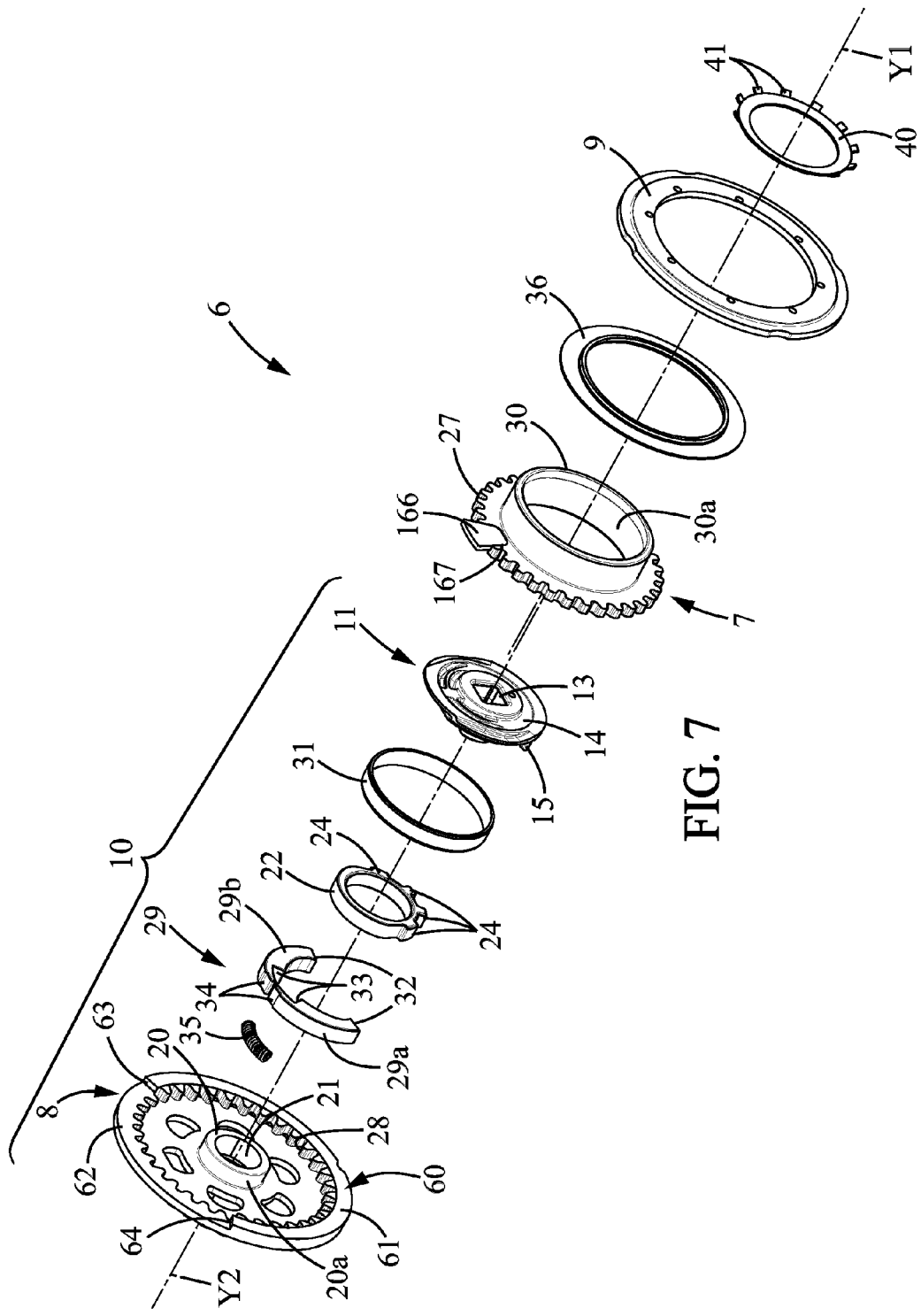
Figure 8:
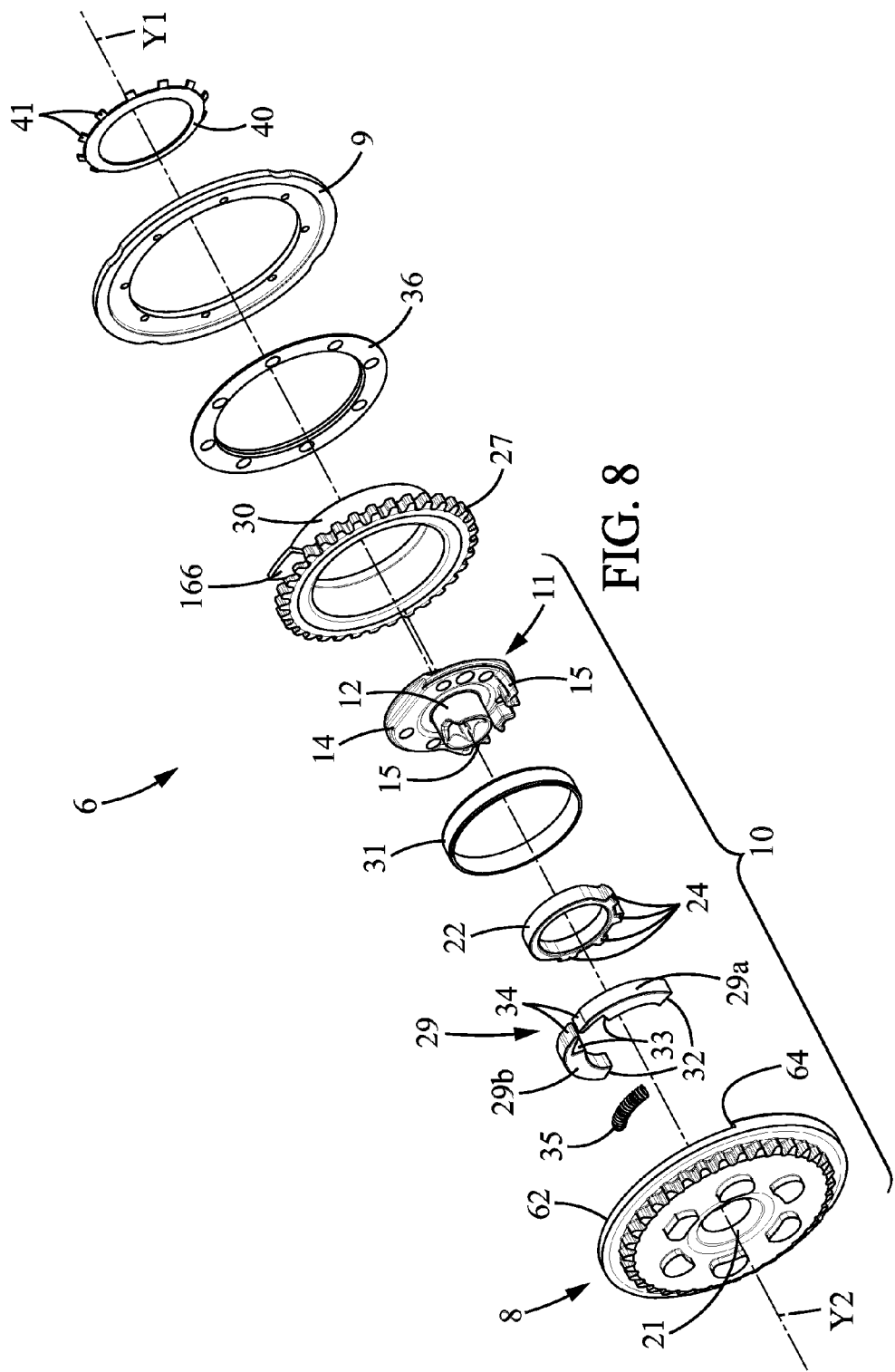
Figure 9:
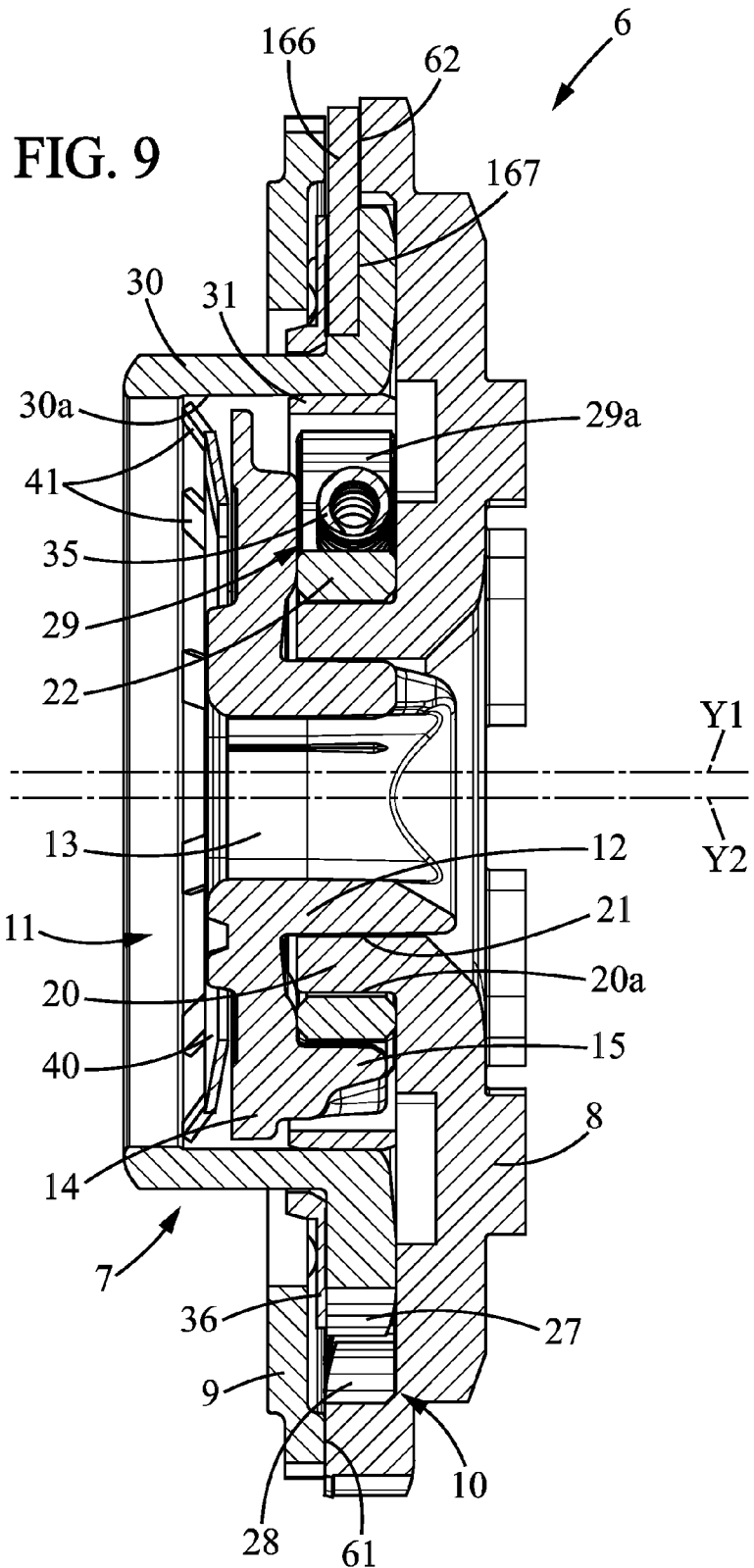
Figure 10:
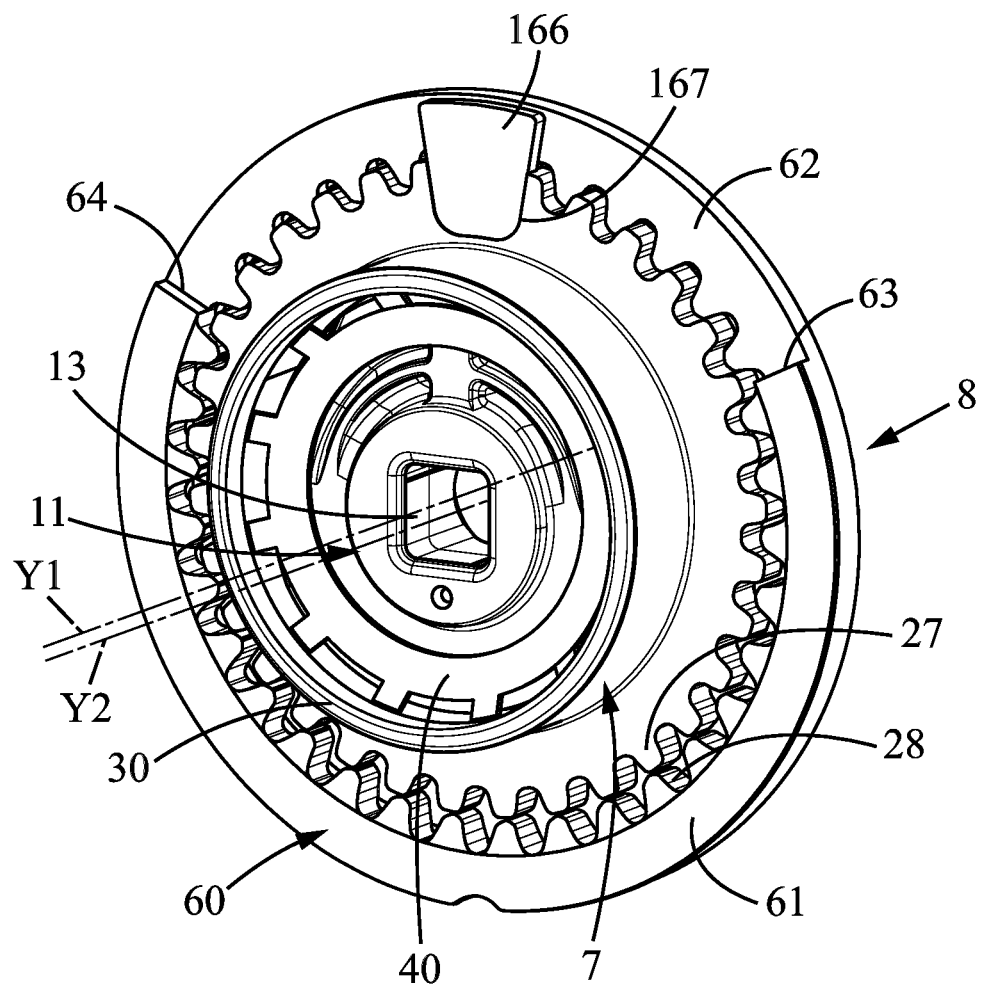
FIG. 10 is a perspective view of a portion of the hinge mechanism of FIGS. 6 to 9.

A first embodiment of the hinge mechanism 6 is represented in FIGS. 2 to 5, which are respectively a perspective view, exploded perspective views in respective directions III and IV of FIG. 2, and an axial sectional view of a hinge mechanism 6 that can equip the seat 1 of FIG. 1 in a first embodiment of the invention.

The hinge mechanism 6 according to the first embodiment comprises a first frame 7 formed, for example, by a first disc-shaped metal plate centered on the first axis Y1, extending in a plane perpendicular to the first axis Y1. The first frame 7 can be, for example, secured to a structural member of the seating part 3.

The hinge mechanism 6 further comprises a second frame 8 formed, for example, by a generally disc-shaped metal plate centered on a second axis Y2 parallel to the first axis Y1 but offset relative thereto.

The second frame 8 is parallel to the first frame 7 and placed so as to abut axially against it, the first frame 7 and the second frame 8 being connected together by a locking ring 9 which will be described below and which, together with the first frame 7 and second frame 8, forms a closed housing defining an interior space of the hinge mechanism 6.

The second frame 8 may be connected, for example, to a structural member of the backrest 2, directly or by means of an reclining frame 16 in the current example which will be described below.

The first frame 7 and second frame 8 are connected together by an adjustment device 10 arranged within the interior space of the hinge mechanism 6. Advantageously, the adjustment device 10 allows adjusting the relative angular position between the first frame 7 and second frame 8, for example by means of the control knob 6a.

In the example considered here, the adjustment device 10 is a hypocycloid gear mechanism driven by a device comprising an input member 11 and an eccentric cam.

The input member 11, visible in FIGS. 2-7, may, for example, be a single part molded of plastic or light alloy. The input member 11 comprises a central shaft 12 extending longitudinally along the second axis Y2, or central axis Y2.

The central shaft 12 may possibly be pierced by an inner recess 13, preferably square, splined, or other, into which a shaft 6a integral to the control knob can fit.

The central shaft 12 extends radially outward at its end furthest from the second frame 8, as a flange 14 extending parallel to the first frame 7 and second frame 8.

An inner face of the flange 14 is extended toward the hypocycloid gear mechanism by at least one driving pin 15, in the current case two driving pins 15, which extends parallel to the second axis Y2 toward the second frame 8, its usefulness to be discussed below.

The shape of the central shaft 12 is a right circular cylinder centered on the second axis Y2 and turning on a bearing integral to the second frame 8 and also centered on the second axis Y2. The integral bearing is here formed by a cylindrical through-hole 21 formed in the second frame 8 and in a neck 20 which is integral to the second frame 8. The neck 20 may, for example, be formed as one piece with the second frame 8 and extend axially from the second frame 8 toward the first frame 7.

The input member 11 is rotatably connected to the eccentric cam which, in the current example, extends perpendicularly to the first axis Y1 and is driven by the input member 11. The eccentric cam turns about the neck 20 in a housing 30a, preferably a right circular cylindrical housing 30a, integral with the first frame 7 and traversing the first frame 7. The housing 30a is centered on the first axis Y1. The housing 30a is delimited in particular by a neck 30, particularly a metal neck 30, integral with the first frame 7.

The eccentric cam may comprise a control ring 22 and a clearance adjustment assembly 29.

The control ring 22 turns on an external cylindrical surface 20a of the neck 20 and is at least partially surrounded by the clearance adjustment assembly 29.

In addition, the control ring 22 is eccentric relative to the second axis Y2 in the example considered here. However, the control ring 22 could be centered on the second axis Y2.

In the embodiment shown, the clearance adjustment assembly 29 comprises at least one cam portion 29a, here two cam portions 29a, 29b, preferably of metal, in the form of wedges arranged facing an external peripheral surface, forming a right circular cylinder, of the control ring 22.

The cam portion 29a, or cam portions 29a, 29b, comprises a first end 32 having a minimum radial thickness and a second end 33 having a maximum radial thickness.

According to the example shown, the two ends 33 of the cam portions 29a, 29b are adjacent to one another, and respectively comprise a notch 34 facing one another, which receive a spring 35 biasing the cam portions 29a, 29b away from one another, or in other words towards a position of maximum eccentricity of the eccentric cam.

The control ring 22 further comprises external teeth 24, in particular four external teeth 24, between the first ends 32 of the cam portions 29a, 29b.

In the described arrangement comprising four external teeth 24, the two outer teeth 24 closest to the cam portions 29a, 29b additionally define shoulders respectively facing the first ends 32 of the cam portions 29a, 29b. However, in the rest state, some clearance exists between each shoulder and the first end 32 of the corresponding cam portion 29a, 29b. The driving pins 15 of the input member 11 substantially fit with the shoulders defined by the external teeth 24.

The control ring 22 just described is particularly suitable for a manual hinge mechanism, meaning a mechanism actuated by a manual control, in particular by the control knob 6a.

However, the present invention also covers a motorized hinge mechanism. In such a configuration, the input member 11 acts on the eccentric cam.

Conversely, in a manual configuration the input member 11 acts on cam portions 29a, 29b.

One will note that it is possible to replace the eccentric cam with a cam having two disc-shaped parts, known from the prior art.

The hypocycloid gear mechanism here is a single-train gear that comprises for example:

a first set of teeth 27, preferably a first circular set of teeth 27, centered on the first axis Y1, oriented radially outward and formed at the periphery of the first frame 7, preferably formed as a single piece with the first frame 7, such that the first frame 7 thus comprises a ring gear, and a second set of teeth 28, preferably a second circular set of teeth 28, formed on the inner face of the second frame 8, oriented radially inward, centered on the second axis Y2 and having an inside diameter greater than the outside diameter of the first set of teeth 27.

The first set of teeth 27 and the second set of teeth 28 are contained within the same radial plane.

Where appropriate, a bushing 31 forming a bearing may be interposed between the eccentric cam and the housing 30a integral to the first frame 7 and traversing the first frame 7. Preferably, the bushing 31 is press-fitted into the housing 30a.

The hinge mechanism 6 may further comprise a locking ring 40, preferably of metal, which retains the hub of the hinge mechanism 6 within the neck 30. The locking ring 40 is fixed within the housing 30a integral to the first frame 7, against the input member 11, by any known means and in particular by press-fitting, for example by means of peripheral tabs 41 press-fitted into the neck 30. The peripheral teeth 41 which here project outward are elastically braced against an inner surface of the neck 30, with the peripheral teeth 41 extending obliquely outward radially and away from the second frame 8.

The hinge mechanism 6 further comprises a stop member 66, preferably integral to the first frame 7 and protruding therefrom. The stop member 66 is arranged within the interior space defined by the first frame 7 and second frame 8. The stop member 66 cooperates in abutment with the second frame 8 to restrict the relative rotation of the first frame 7 and second frame 8 during adjustment between first and second angular end-of-travel positions of the hinge mechanism 6.

The stop member 66 has, for example, in the form of a finger projecting radially outward, formed as one piece with a radial ring 65 in particular a ring fitted around the neck 30 of the first frame 7, preferably from a piece of sheet metal.

More specifically, the radial ring 65 is retained on the neck 30 of the first frame 7 by welding or other methods such as riveting, crimping, etc.

In addition, the radial ring 65 is in contact with an axial face of the first set of teeth 27 on the side opposite the second frame 8. The radial ring 65 is also in sliding contact with a corresponding axial face of the second set of teeth 28, or in immediate proximity to a corresponding axial face of the second set of teeth 28, which is facing away from the second frame 8.

The second set of teeth 28 is formed inside an annular rim 60 of the second frame 8 which protrudes toward the first frame 7. The annular rim 60 has an end face 61 with a stepped-down recess 62 angularly delimited between two shoulders 63, 64. The recess is in the radial plane of the first set of teeth 27 and second set of teeth 28.

The stop member 66 protrudes radially and slides axially against the shoulder 62, or in immediate proximity to the recess 62, which thus forms a track defining a circular arc to guide the stop element 66.

The shoulders 63, 64 form counter-stops cooperating with the stop member 66 to angularly limit the relative pivoting of the first frame 7 and second frame 8 during adjustment of the relative angular position between the first frame 7 and second frame 8.

The reclining frame 16 may be formed by a disc-shaped flange 17, in particular a metal flange 17, centered on the second axis Y2. The periphery of the flange 17 is extended axially along the second axis Y2 by a peripheral ring 18, preferably having the shape of a right circular cylinder centered on the second axis Y2 and at least partially surrounding the first frame 7, the second frame being arranged within the peripheral ring 18 of the reclining frame 16.

The reclining frame 16 may be connected to the second frame 8 by a reclining device 50 operable, for example, by the knob M. However, the reclining device 50, reclining frame 16, and knob M could be omitted, in which case the second frame 8 is directly connected to one of the structural components of the seat 1, for example a structural component of the backrest 2.

The reclining device 50 may, for example, comprise locking knobs 51, particularly of metal, the current example having three of them angularly distributed about the second axis Y2, for example every 120°.

Each of the locking knobs 51 may comprise a body 52 and an external set of teeth 53 which, in the normal usage position, respectively engages a corresponding toothed area 54 formed radially inside the peripheral ring 18 of the reclining frame 16, in the vicinity of the flange 17. The toothed areas 54 may be arranged every 120° and separated by smooth guide tracks 55 forming a circular arc, centered on the second axis Y2 and oriented radially inward.

The locking knobs 51 are radially guided to slide in guides 56 formed in the second frame 8, and are normally kept engaged with the toothed areas 54 by a cam 57 elastically biased toward a locked position by at least one spring 58. The cam 57 is integral, for example, to a lever arm (not shown) connected, in particular by a cable (not shown), to the control lever M, such that actuating the lever M moves the cam 57 to an unlocked position which disengages the locking knobs 51 from the toothed areas 54.

The locking ring 9 may have, for example, the shape of a right circular cylinder having an L-shaped cross-section, with a central portion 9a positioned substantially radially relative to the first axis Y1 and second axis Y2, and an axial peripheral rim 9b extending away from the adjustment device 10. The axial peripheral rim 9b fits without play and is retained radially, in particular welded, against an inner surface 18a of the peripheral ring 18 of the second frame 8.

The hinge mechanism 6 may further comprise a slide ring 36, made for example of synthetic material, in particular Teflon® or other material, interposed axially between the first frame 7 and the locking ring 9. The slide ring 36 provides easy rotation between the first frame 7 and second frame 8.

The hinge mechanism 6 which has just been described operates as follows.

When a user actuates the control knob 6a to adjust the angle of the backrest 2, one of the driving pins 15 of the input member 11 abuts against the first end 32 of one of the cam portions 29a, 29b and drives it angularly to compress the spring 35. This has the effect of decreasing the offset of the eccentric cam.

As the movement continues, the cam portion 29a, 29b displaced by the driving pin 15 then drives the other cam portion 29a, 29b, by means of the spring 35 and/or by the second ends 33 of the cam portions 29a, 29b pressing together, such that the eccentric cam rotates within the bushing 31, which rotates the first axis Y1 about the second axis Y2 in a first angular direction 38. In the present description, the first axis Y1 and second axis Y2 are axes of rotation.

This results in rotation of the first set of teeth 27 within the second set of teeth 28, pivoting the backrest 2. The pivoting is angularly limited by cooperation between the stop member 66 and shoulders 63, 64.

When a user wants to fold down the backrest 2, the user can operate the control lever M which unlocks the reclining device 50, allowing the locking knobs 51 to disengage from the toothed areas 54. The backrest 2 can then rotate freely, for example about 120°, even if the lever M is released, as the locking knobs 51 are then facing the guide tracks 55.

When the user wants to return the backrest to the normal position, with optional actuation of the lever M, the locking knobs 51 then lock themselves in their locked positions within the toothed areas 54 where they were originally located.

FIGS. 6 to 9 are views respectively similar to FIGS. 2 to 5 for a second embodiment of the invention, and figure is a perspective view of a portion of the hinge mechanism 6 of FIGS. 6 to 9.

The second embodiment of the invention, represented in FIGS. 6 to 10, essentially differs from the previously described first embodiment in that:
- the hinge mechanism 6 has no reclining device 50 or reclining frame 16, the second frame 8 being, for example, attached to the backrest 2 frame and the seat 1 not having a recline control lever M in such case;
- the first frame 7 and second frame 8 are not assembled by the locking ring 9, but are assembled by a metal ring welded to the end face 61 of the annular rim 60 of the second frame 8;
- the hinge mechanism 6 does not comprise the stop member 66 and ring 65, but a stop member 166 in the form of a wedge fixed to the first frame 7, for example by press-fitting and/or welding it.

As in the first embodiment, the annular rim 60 of the second frame 8, in which is formed the second set of teeth 28, includes the recess 62 extending angularly between the two shoulders 63, 64. The second set of teeth 28 here extends axially to the end face 61 of the annular rim 60 so that the recess 62 fits with a portion of the second set of teeth 28 of reduced axial thickness.

The stop member 166, preferably made of sheet metal, extends radially. The stop member 166 fits into a housing 167 of complementary shape recessed in an axial face of the first frame 7 facing away from the second frame 8. In addition, the housing 167 is formed at the periphery of the first frame 7, in only a portion of the axial thickness of the first set of teeth 27. Preferably, the second set of teeth 28 is therefore of reduced thickness along the guide track 62.

More specifically, the stop member 166 is retained by welding or other methods such as riveting, crimping, etc.

The stop member 166 protrudes outwardly from the first set of teeth 27, into the free space between the recess 62 and the locking ring 9, such that the stop member 66 is guided between these two elements.

The operation of the second embodiment of the invention is identical to what was described above for adjusting the angle between the first frame 7 and second frame 8.

The invention is, of course, not limited to the embodiments described above and provided solely as an example. It covers various modifications, alternative forms, and other variants envisaged by a person skilled in the art within the context of the invention, particularly any combination, separately or in combination, of the various modes of operation described above.

The invention claimed is:

1. A hinge mechanism comprising:
a first frame and a second frame mounted to rotate relative to one another about at least one axis of rotation and at least partially bounding an interior space, the second frame comprising an annular rim at least partially receiving the first frame and having an axial end face,
an adjustment device adapted to allow adjustment of the angular position between the first frame and second frame,
a stop member distinct from the first frame and fixed to the first frame, said stop member being at least partially arranged within the interior space, the stop member cooperating in abutment with the second frame to limit the relative rotation of the first frame and second frame between first and second angular end-of-travel positions,
wherein the axial end face of said annular rim comprises a stepped-down recess in only a portion of an axial thickness of the annular rim and extending angularly between two shoulders, said recess forming a guide track along a circular arc contained in a radial plane and extending angularly between said two shoulders forming counter-stops,
and wherein the stop member extends in a radial plane in immediate proximity to the radial plane containing the guide track, said stop member projecting radially to said guide track, such that the stop member is mounted to move along said guide track and is adapted to cooperate with said counter-stops to limit the relative rotation of the first frame and second frame between the first and second angular end-of-travel positions.

2. The hinge mechanism according to claim 1, wherein the first frame comprises a first set of teeth directed radially outward, and the second frame comprises a second set of teeth formed in the annular rim, directed radially inward, the first set of teeth meshing with the second set of teeth in a radial plane containing the guide track in order to adjust the relative angular position between the first frame and second frame.

3. The hinge mechanism according to claim 2, wherein the stop member is a wedge secured within a housing provided in the first frame and the housing is formed at a periphery of the first frame in only a portion of the thickness of the first set of teeth.

4. The hinge mechanism according to claim 2, wherein the stop member is a wedge secured within a housing in the first frame.

5. A vehicle seat comprising first and second parts connected to each other by a hinge mechanism according to claim 2, the first and second frames being attached one to the first part and the other to the second part.

6. The seat according to claim 5, wherein one of the first and second seat parts is a seating part, and the other is a backrest.

7. A hinge mechanism comprising:
a first frame and a second frame mounted to rotate relative to one another about at least one axis of rotation and at least partially bounding an interior space the second frame comprising an annular rim at least partially receiving the first frame and having an axial end face,
an adjustment device adapted to allow adjustment of the angular position between the first frame and second frame,
a stop member protruding from the first frame, said stop member being at least partially arranged within the interior space, the stop member cooperating in abutment with the second frame to limit the relative rotation of the first frame and second frame between first and second angular end-of-travel positions,
wherein the axial end face of said annular rim comprises a stepped-down recess in only a portion of an axial thickness of the annular rim and extending angularly between two shoulders, said recess forming a guide track along a circular arc contained in a radial plane and extending angularly between said two shoulders forming counter-stops,
and wherein the stop member extends in a radial plane in immediate proximity to the radial plane containing the guide track, said stop member projecting radially to said guide track, such that the stop member is mounted to move along said guide track and is adapted to cooperate with said counter-stops to limit the relative rotation of the first frame and second frame between the first and second angular end-of-travel positions,
wherein the stop member is in the form of a pin projecting radially outward, formed as an integral part of a radial ring.

8. The hinge mechanism according to claim 7, wherein the radial ring is integral to the first frame.

9. The hinge mechanism according to claim 7, wherein the first frame comprises an axial neck.

10. The hinge mechanism according to claim 9, wherein the radial ring is fixed to the axial neck.

* * * * *